April 9, 1968
E. E. BRADISH
3,376,902
LOOM PICKER MECHANISM
Filed Sept. 26, 1966
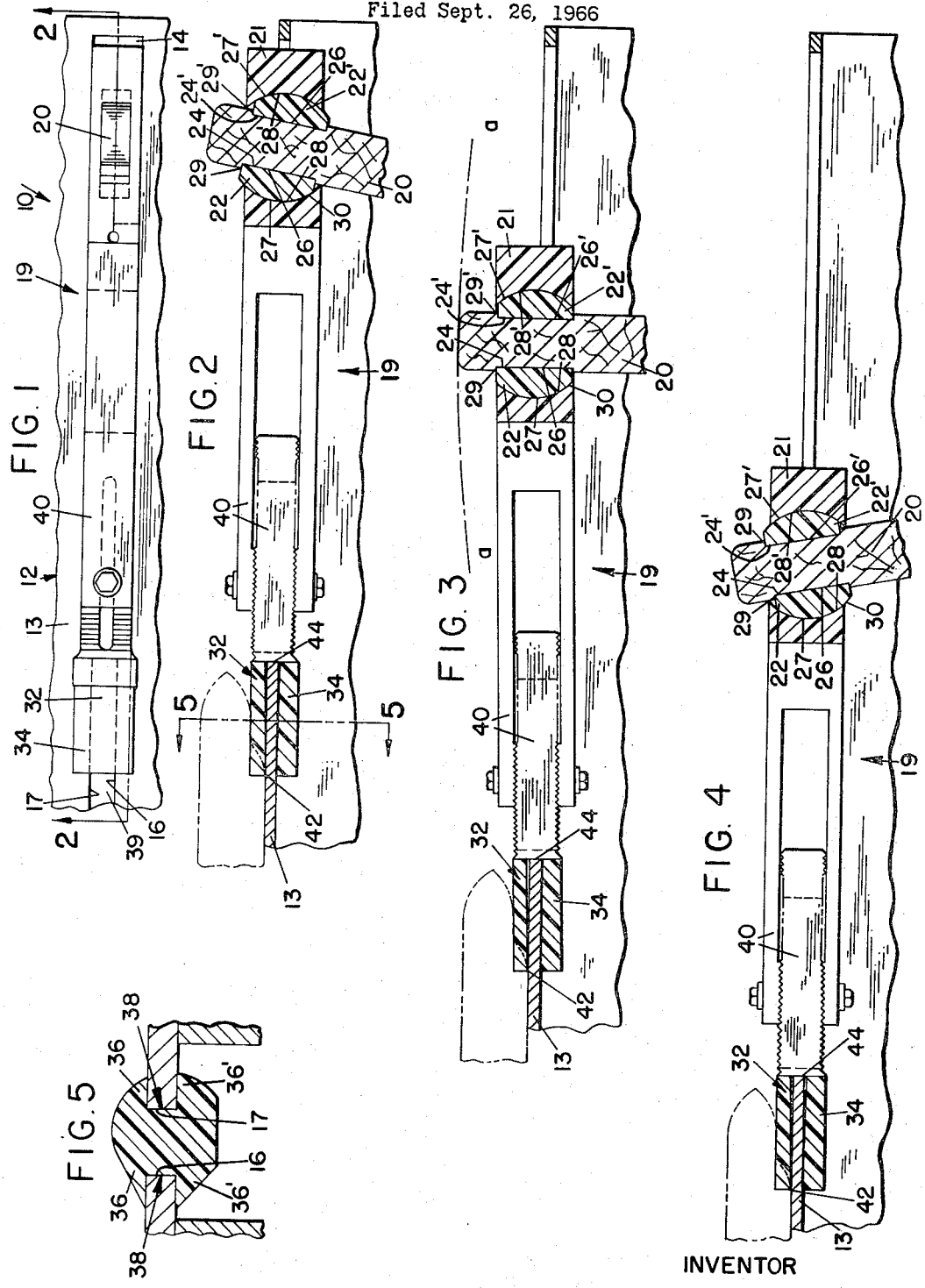
INVENTOR
ELLIOTT E. BRADISH
BY *Howard H. Harness*
ATTORNEY

United States Patent Office 3,376,902
Patented Apr. 9, 1968

3,376,902
LOOM PICKER MECHANISM
Elliott E. Bradish, Worcester, Mass., assignor to Crompton & Knowles Corporation, Worcester, Mass., a corporation of Massachusetts
Filed Sept. 26, 1966, Ser. No. 582,083
6 Claims. (Cl. 139—159)

ABSTRACT OF THE DISCLOSURE

An elongated picker which has a portion that is longitudinally guided on the picking end and pivotally connected to the picker stick on the opposite end, so as to provide a parallel picking motion to the shuttle.

---

This invention relates to loom picker mechanisms and more particularly to that type used in the loom shown in commonly assigned U.S. application Ser. No. 489,869 filed Sept. 24, 1965.

One of the most persistent problems in loom picker mechanisms has been the high incidence of wear and breakage to the pickers while at the same time trying to achieve a so-called parallel pick. There have been many attempts to have the picker head which makes contact with the shuttle, move in a relatively horizontal path so that the shuttle is always propelled in a path which is parallel to the race plate of the loom.

Some parallel pickers have been developed which make use of complicated mechanism supporting the bottom of the picker stick to cause the picker head to move in a horizontal path. Other more simpler attempts to get a parallel pick have been in the direction of making the picker head fit very loosely on the stick to enable the head to move relative to the stick. The picker head is guided in a parallel plane while the top of the stick moves up and down due to its arc. This causes the stick to strike the picker head as well as to slide against it resulting in much wear and breakage. Still other parallel pickers have made use of arcuate inserts which fit into arcuate surfaces in the picker head and which are independently rotatable on the picker head. This type of picker allows the stick to move through its arc without either lifting or tilting the picker head but does not eliminate wear due to the fact that the inserts are caused to slide on the stick. There is also considerable loss of power due to the sliding action under pressure. An example of this type of picker is shown in British Patent No. 703,857.

It is an object of the invention to provide a simple picker mechanism which will propel the shuttle in a line generally parallel to the race plate.

In order to eliminate all the disadvantages described above it is a further object of the invention therefore to provide a simple loom picker mechanism in which the picker body is pivoted directly to the picker stick and is guided on the lay with the result that a substantially parallel pick is achieved.

According to the present invention the above-noted objects are attained by providing an elongated picker body, one portion of which is pivotally connected to the picker stick and another shuttle engaging portion which is longitudinally guided by the top plate of the lay during its entire stroke or motion. Because it is allowed to pivot on the stick, the picker body assumes a horizontal position parallel with the lay at the beginning and at the end of a picking stroke when the picker stick is at the lower limits of its arcuate path of motion. Since the picker body is horizontal at the last moment of contact the shuttle will be picked in a straight horizontal path parallel with the lay.

The invention will be described in greater detail by reference to a specific embodiment as illustrated in the accompanying figures of drawings wherein:

FIGURE 1 is a plan view of the loom picker of the instant invention;

FIGURE 2 is a longitudinal section on line 2—2 of FIGURE 1 showing the picker at the beginning of the picking motion;

FIGURE 3 is a view similar to FIGURE 2 and showing the picker as the stick reaches the top of its arc;

FIGURE 4 is a view similar to FIGURE 2 and showing the picker at the end of a picking operation; and FIGURE 5 is an enlarged vertical section on line 5—5 of FIGURE 2 showing the guiding flanges.

Referring now to the drawings there is shown in FIGURE 1 a picking mechanism generally indicated by the reference character 10 operatively disposed in a lay 12 which has a top plate 13. Plate 13 has a longitudinal slot 14 to accommodate picker mechanism 10.

Picking mechanism 10 comprises a picker stick 20 which extends through slot 14 and a picker body 19 having an end portion 21 which is pivotally attached to stick 20 through bearing members 22, 22'. Bearing members 22, 22' are in the form of inserts having flat surfaces 24, 24' respectively which abut recessed surfaces 26, 26' respectively of slots 29, 29' in stick 20 and arcuate surfaces 27, 27' which are respectively rotatably slidably mounted against arcuate surfaces 28, 28' which define a cavity 30 in end 21 of body 19. Bearing members 22, 22' can be attached to the picker stick in any manner so long as they are operatively integral therewith.

The other end 32 of picker body 19 has a shuttle engaging picker head 34 which has upper and lower flanges 36, 36' respectively situated on opposite sides of head 34 and which define a pair of slots 38. Slots 38 guide head 34 on wall portions 16 and 17 of a reduced or narrow portion 39 of slot 14. Ends 21 and 32 of body 19 are connected by an elongated portion 40 which can be made in two adjustable sections one of which is slidable within the other as indicated in FIGURES 2-4 with a locking screw to hold them together.

Picker body 19 and inserts 22, 22' can be made of any material but a picker body made of high molecular weight polyethylene has been found to be very good due to its high impact and shock absorbing properties. It has also been found to be desirable to make inserts 22, 22' of a plastic material having good bearing characteristics and which is made of a different material from the material of body 19. Examples of such materials are nylon, acetal homopolymers and acetal copolymers; the latter two being similar to nylon and marketed under the trade names Delrin and Celcon by Dupont and Celanese Corporation, respectively.

In FIGURE 2, the picking mechanism is in its outer position preparatory to a shuttle picking operation.

FIGURE 3 shows the picking mechanisms midway through a picking stroke at which point the picker stick 20 is at the top of its picking arc as indicated by dot and dash line a—a. Because bearing members 22, 22' are held in slots 29, 29' and are not allowed to slide on stick 20, the end 21 of body 13 is raised with stick 20. Since pick body 19 is guided on plate 13 by flanges 36, 36', body 19 pivots around members 22, 22' relative to stick 20. In this position the entire body 19 is at an angle with respect to lay 12 from a point 42 on flange 36 adjacent the point where picker head 34 engages the shuttle which is shown in dotted lines in FIGURES 2-4. To enable body 19 to assume the angle shown in FIGURE 3, slot 38 is made so that it widens slightly from point 42 to a point 44 at the opposite end of the slot.

Referring to FIGURE 4, picking mechanism 10 is shown at the end of its picking stroke at which point the upper portion of stick 20 has dropped to the same vertical level as it was in FIGURE 2. Picker body 19 continues to rotate around members 22, 22' from the position shown in FIGURE 3 to the position shown in FIGURE 4 but because body 19 is allowed to pivot relative to stick 20, it assumes the same horizontal position with respect to lay 12 as in FIGURE 2. This means that the entire body 19 is moving in a horizontal direction parallel with lay 12 at the very end of the pick just before it looses contact with the shuttle. This is the most critical point of picking and insures that the shuttle is projected across the loom in a straight path parallel with lay 12. The longer the elongated portion 40 is, the less of an angle there is between picker body 19 and lay 12 when body 19 is in the position shown in FIGURE 3 and consequently the less difference in width there is in slot 38 from point 42 to point 44. However, the invention is not limited to any particular length of body 19 as long as it is long enough to have a portion which can be guided on the lay and will remain guided throughout its picking motion since body 19 always returns to a parallel position relative to the lay at the end of its stroke.

The invention is not limited to the exact configuration of shuttle engaging portion 34 or shuttle engaged thereby as shown in the drawings, nor to the type of loom shown in Ser. No. 489,869, supra as they merely illustrate the invention. While a preferred embodiment of the invention has been shown, it is to be understood that changes and variations may be made herein without departing from the spirit and scope of the invention which is to be limited only as defined by the following claims.

What is claimed is:
1. A picking mechanism for a loom for picking a shuttle across a reciprocating lay having a slotted top plate at each end thereof, said picking mechanism comprising:
 (A) a picker stick operatively disposed in one of said slotted top plates; and
 (B) an elongated picker body comprising:
  (a) a picker head having a guided shuttle engaging portion guided in a path substantially parallel to said lay;
  (b) a portion pivotally connected to said picker stick; and
  (c) an intermediate portion connecting said pivoted portion of said picker body with said picker head; whereby said picking mechanism operates with a minimum of friction, and is effective to propel the shuttle in a straight line in a direction substantially parallel with the lay.

2. The picking mechanism as described in claim 1 wherein said pivotal connection comprises:
 (a) internal arcuate surfaces defining a radial cavity in said pivoted portion of said picker body; and
 (b) a pair of arcuate bearing members effectively attached to said picker stick and rotatable in said arcuate surfaces.

3. The picking mechanism as described in claim 2 wherein said picker body is made of an ultra high molecular weight polyethylene and said members are made of nylon.

4. The picking mechanism as described in claim 2 wherein said members are made of an acetal homopolymer.

5. The picking mechanism as described in claim 2 wherein said members are made of acetal copolymer.

6. The picking mechanism as described in claim 1 wherein said guiding portion of said picker head comprises a pair of flange members on each side of said picker head for engagement with edge portions which define the slot of one of said top plates through which said picker stick operates, whereby said shuttle engaging position is guided on said top plate throughout its motion.

References Cited
UNITED STATES PATENTS

| | | |
|---|---|---|
| 479,903 | 8/1892 | Teweles et al. |
| 890,835 | 6/1908 | Baber _____ 139—159 X |

FOREIGN PATENTS

| | | |
|---|---|---|
| 597,667 | 9/1925 | France. |
| 1,253,152 | 12/1960 | France. |
| 279,248 | 10/1914 | Germany. |
| 855,078 | 11/1952 | Germany. |
| 3,448 | of 1883 | Great Britain. |
| 802,932 | 10/1958 | Great Britain. |

OTHER REFERENCES 1,016,649 September 1957 German publication Krafft 139–159.

MERVIN STEIN, *Primary Examiner.*

J. KEE CHI, *Assistant Examiner.*